No. 669,615. Patented Mar. 12, 1901.
M. E. BRIGGS.
ROD PACKING.
(Application filed Dec. 22, 1900.)
(No Model.)

WITNESSES
Edward W. Currell
G. L. Bilfry.

INVENTOR,
Morris E. Briggs
by
Emil Starck, Atty

UNITED STATES PATENT OFFICE.

MORRIS E. BRIGGS, OF ALTON, ILLINOIS, ASSIGNOR TO THE PILLEY PACKING AND FLUE BRUSH MANUFACTURING COMPANY, OF ST. LOUIS, MISSOURI.

ROD-PACKING.

SPECIFICATION forming part of Letters Patent No. 669,615, dated March 12, 1901.

Application filed December 22, 1900. Serial No. 40,760. (No model.)

*To all whom it may concern:*

Be it known that I, MORRIS E. BRIGGS, a citizen of the United States, residing at Alton, in the county of Madison and State of Illinois, have invented certain new and useful Improvements in Rod-Packings, of which the following is a full, clear, and exact description, reference being had to the accompanying drawings, forming a part hereof.

My invention has relation to improvements in rod-packings; and it consists in the novel construction of packing more fully set forth in the specification and pointed out in the claims.

Figure 1:
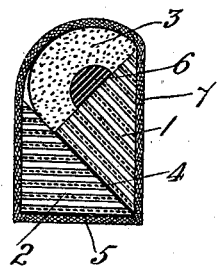
Figure 2:
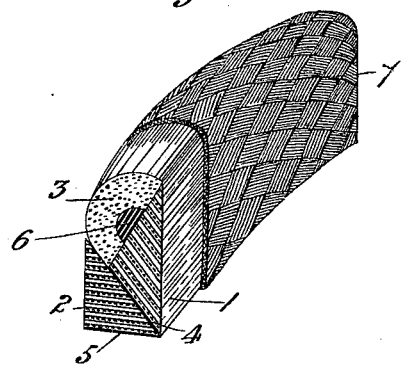
Figure 3:
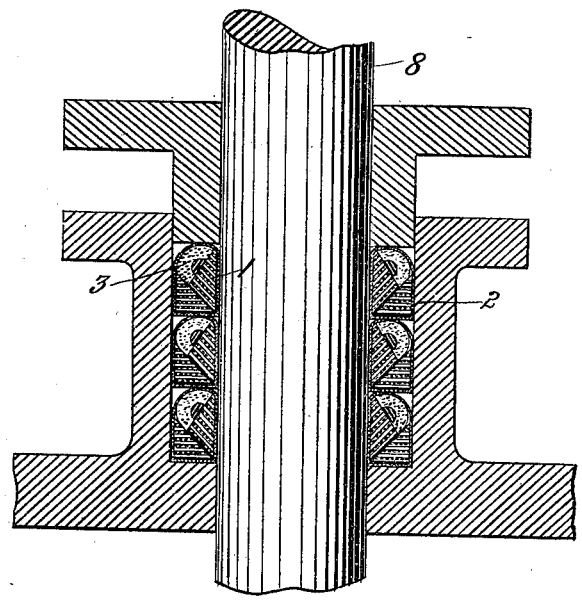

In the drawings, Figure 1 is a transverse section of the packing. Fig. 2 is a perspective view of a section of the packing, a part of the outer cover or layer being removed; and Fig. 3 is a sectional detail of a stuffing-box, showing my invention applied thereto.

The object of my invention is to construct a rod-packing which will not only take up any wear to which the same may be subjected, but whose constituent parts will expand in directions which will insure for the packing a perfectly tight joint.

In detail the invention may be described as follows:

Referring to the drawings, 1 and 2 represent, respectively, the inner and outer wedge-shaped sections of the packing, the same being made of flexible material—such as cotton, duck, and rubber—the inclined face of the section 2 and one of the inclined faces of section 1 being juxtaposed, the former overlapping the latter a suitable distance. Disposed along the adjacent inclined face of the section 1 is the plane face of a substantially semicylindrical cotton-duck section 3, a portion of whose periphery bears against the overlapping surface of section 2. The face or plane of contact between sections 1 and 3 is disposed substantially at right angles to the inclined face of section 2. Interposed between the juxtaposed faces of sections 1 and 2 is a layer of rubber 4, said layer terminating at the plane face of the section 3. Disposed along what constitutes the basal surface of the section 2 is a layer or sheet of rubber 5, and disposed in a suitable groove or recess formed in the plane face of section 3 and contacting with the section 1 is a rubber strip 6. The several sections are bound together or covered by a woven cotton-duck outer layer 7.

The wedge-shaped sections 1 and 2 allow for the necessary slipping to take up the wear to which the packing is subjected, and by reason of the expansible nature of the rubber sheets 4 and 5 and strip 6 the packing as a whole is expanded in every direction, (under the temperature generally prevailing in stuffing-boxes,) thus making an absolutely tight joint between the rod 8 and the several packing-rings. (See Fig. 3.) In the present construction not only is there an expansible layer of rubber interposed between the juxtaposed faces of the wedge-sections and between the latter and the semicylindrical section, but there is also disposed a rubber layer at the base of the outer section between said section and the outer covering or wrapper.

I do not, of course, limit myself to the precise details herein set forth, as the same may be departed from in a measure without departing from the spirit of my invention.

Having described my invention, what I claim is—

1. A packing comprising an inner and an outer wedge-section, the inclined face of the outer overlapping one of the inclined faces of the inner section, a sheet or layer of rubber interposed between the sections, and a third section superposed on the adjacent inclined face of the inner section, substantially as set forth.

2. A packing comprising an inner and an outer wedge-section, the inclined face of the outer overlapping one of the inclined faces of the inner section, a sheet or layer of rubber interposed between the sections, and a third substantially semicylindrical section superposed on the adjacent inclined face of the inner section, substantially as set forth.

3. A packing comprising an inner and an outer wedge-section, the inclined face of the outer section overlapping one of the inclined faces of the inner section, a sheet or layer of rubber interposed between the sections, a third substantially semicylindrical section superposed with the plane face against the adjacent inclined face of the inner section, a groove formed in the plane face of the third section and containing a rubber strip contacting with the adjacent face of the inner section, and a rubber layer at the base of the outer section, substantially as set forth.

In testimony whereof I affix my signature in presence of two witnesses.

MORRIS E. BRIGGS.

Witnesses:
 EMIL STAREK,
 G. L. BELFRY.